Oct. 4, 1949.　　　M. A. DA SILVA　　　2,483,488
LIFESAVER
Filed Jan. 12, 1946　　　　　　　　　　　　　2 Sheets-Sheet 1
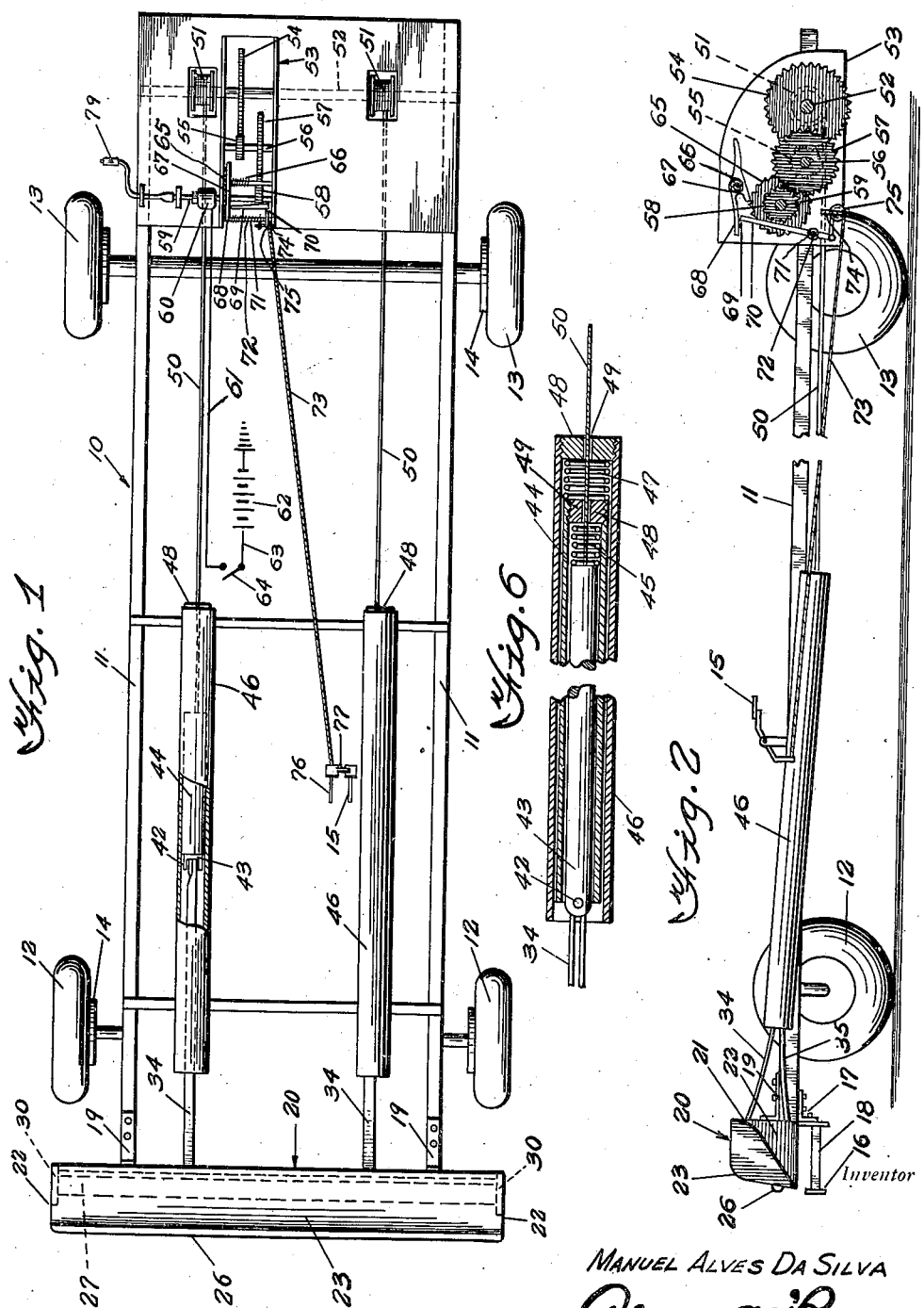
Inventor
MANUEL ALVES DA SILVA
By Clarence A. O'Brien
and Harvey B. Jacobson
Attorneys Oct. 4, 1949.  M. A. DA SILVA  2,483,488
LIFESAVER
Filed Jan. 12, 1946  2 Sheets-Sheet 2

Inventor
MANUEL ALVES DA SILVA

By Clarence A. O'Brien
and Harvey B. Jacobson
Attorney.

Patented Oct. 4, 1949

2,483,488

UNITED STATES PATENT OFFICE 2,483,488

LIFESAVER

Manuel Alves da Silva, Newark, N. J.

Application January 12, 1946, Serial No. 640,785

7 Claims. (Cl. 293—26)

My invention relates to a life saver or safety attachment for automobiles and other vehicles including passenger cars, trucks, buses, and locomotives and trains, designed to prevent or lessen the injuries to persons struck thereby, and lessen the impact, so that the force of the blow will not result in serious injury or death when an accident occurs.

An object of the invention is to provide a life saver or safety device for automobiles and the like, having an impact cushioning means into which a person is deflected when struck, and adapted to be projected into operative position automatically, upon applying the brakes of the vehicle so as to instantaneously open out in front of the vehicle at the moment that the brakes are applied, upon depressing the brake control foot pedal, the impact cushioning and absorbing device having forwardly divergent cushioning members between which a person is guided upon being struck, with flexible cushioning sheets or coverings of textile sheet material to soften the blow.

Another object of the invention is to provide a safety device of the character described, which is placed in a hood when retracted and not in use, such as in front of an automobile over the front bumper, so as to be inconspicuous and not appreciably detract from the appearance of the vehicle and applied to present automobiles, or new cars without material modification in adapting the same thereto.

Another object of the invention is to provide a safety device, adapted to be projected in front of the bumper of a car in advance thereof automatically upon applying the brakes by means of the brake pedal and which is instantaneously released thereby as well as provided with power or manually operated means for retracting or resetting the same after emergency use, so that the device will always be in position for instantaneous use when required.

Other objects and advantages reside in the details of construction and operation as more fully hereinafter described and claimed, reference being had to the accompanying drawings forming part hereof, wherein like numerals refer to like parts throughout, and in which:

Figure 1 is a plan view showing an automobile chassis, with the life saver or safety device applied thereto, and shown partly in section.

Figure 2 is a side elevation of the structure shown in Figure 1.

Figure 6 is an enlarged longitudinal sectional view of one of the projecting devices for the safety device or impact cushioning means.

Figure 3:
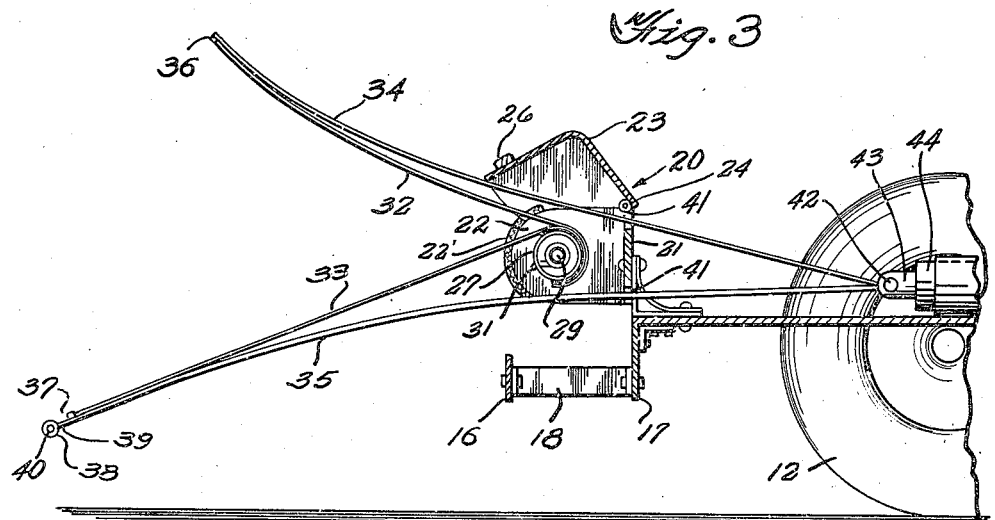
Figure 3 is an enlarged fragmentary longitudinal sectional view taken vertically through the safety device.
Figure 4:
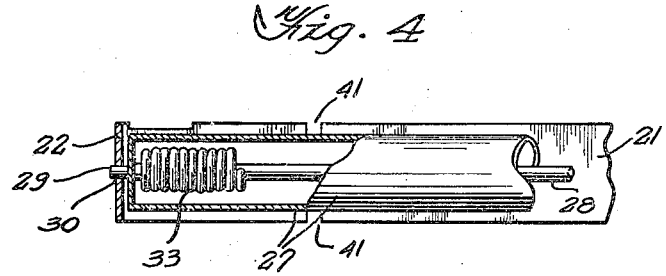
Figure 4 is a fragmentary sectional elevation showing a spring roller, upon which the flexible cushioning sheets are adapted to be wound when retracted and not in use, and from which they are adapted to be unwound when projected for use.

Referring to the drawings in detail, the device is shown applied to a vehicle illustrated as an automobile, the chassis of which is shown, including a frame 10 having the usual side bars or channel members 11, front steering wheels 12 having the usual steering mechanism including the front steering knuckles and rear drive wheels 13, all of the wheels being provided with the usual brakes 14, operated by mechanical or hydraulic means or a combination thereof as is common in the art, from a brake pedal 15 as is well known in the art. These brakes, are shown as the usual four-wheel brakes of the internal expanding type housed within the usual brake drums and simultaneously actuated with the brake pedal 15, though it is not desired to be limited thereto. A front bumper 16 is provided at the front of the chassis or frame and may be of any suitable construction. It is shown as attached to an angle bar 17 carried at the under side of the side members 11 of the frame and may be of suitable spring cushioning construction at 18 and adjustable forwardly and rearwardly beneath the frame when mounted as shown.

At the front of the frame over the bumper 16 and fastened to suitable brackets 19 carried by the frame 10 as by longitudinal side bars 11, is a relatively small hood or housing 20 which may be open at the top, front and bottom, if desired. This hood includes a back wall 21 having forwardly directed end walls 22 forming a substantially U-shaped member in plan and having a cover or lid 23 hinged to the top edge of the back wall as indicated at 24 with springs 25 normally holding the cover closed down at the front of the hood and sides or ends thereof. In side elevation or cross section, the hood cover is of right angular formation and closed at the ends, top and front, which latter bears a bumper bar 26 to prevent injury thereto in case of impact with another vehicle and to give the necessary rigidity and stiffness thereto. The ends 22 form a bracket to rotatably support a spring roller 27, the pintle 28 of which has its ends 29 fixed in rectangular openings 30 in the ends 22 of the housing or hood, so as to prevent its rotation. However, it is understood that any other form of spring roller may be employed so long as the same is adapted to wind in one direction, as by means of coiled springs or the like 31 shown anchored to one end of the hollow casing of the roller and the other to the pintle.

The impact cushioning device for preventing injury to a person struck by the machine or vehicle in front of the front bumper, and so as to prevent impact with the latter, includes an open mouthed sheath, comprising two textile sheets or strips 32 and 33, both of which are anchored at one end to the roller 27 to wind thereon one over the other, preferably extending over the top of the roller and coiled thereon in one direction or clockwise as shown. These sheets or strips, are disposed within upper and lower resilient spring arms 34 and 35 which converge away from each other forwardly, when projected as will be later described, and are connected at their forward ends by cross bars 36 and 37 connecting the transversely spaced parallel spring arms 34 and 35 and extending to the ends of the hood and roller or in close proximity thereto. The lower spring arms 35 at their forward ends also carry a transverse rod 40 which is preferably of circular cross-section to form a shaft adapted to mount a plurality of rollers 38, so that when the lower member is sprung downwardly or depressed by the weight of a person, animal or object in impact therewith, the same may roll along the ground, in front of the vehicle. As shown, the lower transverse bar 37 carries forwardly extending brackets 39 on which the shaft 40 in the form of a circular rod held stationary in the brackets, rotatably supports the rollers 38. Ends 22 have safety cushions 22'.

Figure 5:
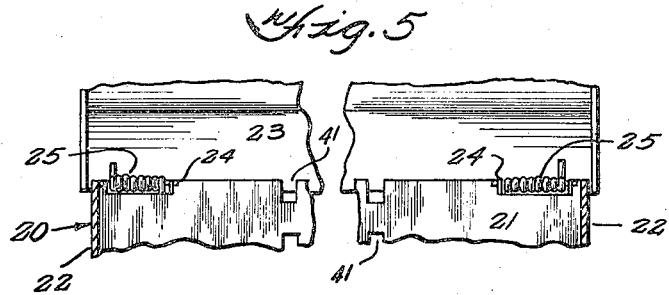
Figure 5 is a fragmentary elevation showing the hood or housing for storing the impact cushioning means and showing the cover and springs for normally closing the cover automatically when the cushioning device is retracted.
Figure 7:
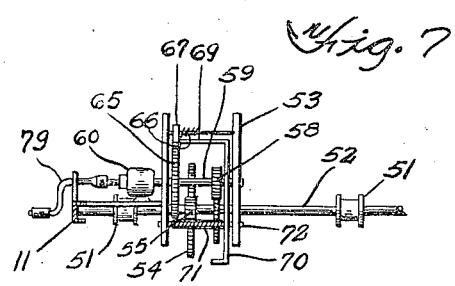
Figure 7 is a front elevation of the winding and release mechanism for the cables.

The spring arms 34 and 35 extend rearwardly above and below the roller 27 under the cover 23 of the hood or housing 20 and through notches or slots 41 in the upper and lower edges of the back portion 21 of the hood as seen in Figures 3 and 5 of the drawings. They are disposed in rearwardly converging relation and anchored at their inner or rear ends in pivotal connection as at 42, with the forward bifurcated ends of plungers 43 by reason of spaced apertured ears provided at the forward ends of said plungers. These plungers operate through the open front ends of telescopic cylinders 44 and 46 closed at their rear ends and having springs 45 confined therein between the rear ends of the cylinders 44 and the corresponding ends of the plungers, so as to tend to expel the latter forwardly to the forward ends of inner cylinders 44 and outer cylinders 46 in which the inner cylinders 44 are adapted to move. In addition, springs 47 are disposed between the inner ends of the cylinders 44 and the inner ends of the cylinders 46, which as well as cylinders 44, may be closed by plugs 48 having axial openings 49 therein. These projecting devices including the cylinders, are supported in spaced parallel relation and substantially horizontally, but preferably slightly inclined rearwardly on the frame of the machine in any suitable way so that the cylinders 46, which are also open at their forward ends, are held from movement. When the open mouth sheath or impact cushioning device is retracted, the spring arms 34 and 35 move together and enter the outer cylinders 46 as the plungers 43 are drawn into the inner cylinders 44 against the action of the springs 45 and the cylinders 44 move rearwardly in telescopic relation thereto and within the cylinders 46 against the action of the springs 47. In other words, the springs 45 and 47 normally tend to expand, and move the plungers forwardly to project the spring arms 34 and 35 and unwind the flexible sheath or strips 32 and 33 by the sheath forwardly in open position diverging outwardly or upwardly and downwardly in divergent spaced relation to each other with the lower member preferably projecting forwardly of the upper member.

In order to hold the impact cushioning device rearwardly or retracted and to release the same, the rear or inner ends of cylinders 44 are also provided with axial openings similar to the openings 49 and flexible cables 50 are connected to the plungers 43 at their rear or inner ends and extend through the axial openings 49 in plugs 48 or inner ends of cylinders 44 and 46 and springs 45 and 47 so as to draw rearwardly thereon and move the plungers 43 into the cylinders 44 against the springs 45 to compress the latter and then successively cause the cylinders 44 to be moved inwardly or rearwardly in the outer cylinders 46 against the action of the springs 47 until the arms 34 and 35 are retracted in restricted form, while the flexible strips 32, 33, which may be of canvas or other suitable material, are at the same time automatically wound upon the roller 27 in the hood or housing 20. The rear extremities of the cables 50 are wound on drums 51 fixed to a shaft 52 suitably journaled across the rear portion of the frame 10 and a clock mechanism or reducing gear constituting a winding mechanism for the cable, as well as a releasing mechanism to permit unwinding thereof upon depressing the foot pedal 76, is provided. This includes an auxiliary frame 53 having spaced side plates through which the shaft 52 extends and is also journaled. The shaft 52 carries a large pinion 54 which meshes with a smaller pinion 55 mounted on an arbor 56, which latter is journaled in the frame 53 and carries a larger intermediate pinion 57 in mesh with a still smaller pinion 58 on an arbor or shaft 59 having a squared outer end by which a crank 79 may be applied thereto for operating the gear train to wind the cables 50 on the drums 51. The shaft 59 is also operatively connected to the rotor of a motor 60 supported in the frame and shown as an electric motor. This motor is shown connected by a conductor 61 to the car battery 62 usually employed for starting, ignition and lighting purposes, from which conductor 63 extends to a switch 64 on the dash for control of the winding of the cables and retraction of the safety device by power. The shaft 59 also carries a ratchet wheel 65 with which a pawl 67 normally engages under the action of a spring 66 fixed to the pawl 67 and pivot thereof, within the frame 53. The pawl 67 is weighted at its rear end, and is provided at its forward end with a fork 68, the upper arm of which is longer than the lower arm and extends forwardly for engagement by the lateral arm 69 of a lever 70 extending downwardly and forwardly below the frames 53 and 10 under the chassis in front of the frame 53 and normally held rearwardly at its upper end by a spring 71 on the pivot 72 of the lever 70 and anchored at one end to the frame and at the outer end to the lever so that the pawl 67 may normally engage the ratchet wheel 65 to hold the cables under tension when wound upon the drums 51 and the safety device is retracted. A release cable 73 is connected to the lower end of the lever 70 and extends around a pulley 74 journaled in a bracket 75 suspended beneath the chassis or frame 10 of the vehicle and then extends forwardly for connection with a foot lever or pedal 76 adjacent the pedal 15 for applying the brakes. The foot pedal 76 has a lateral extension or arm 77 extending over the pedal 15 so that upon depression of the brake pedal 15, the brakes may be applied without releasing the safety device, while upon depression of both pedals, the brakes will be applied and the lever 70 swung on its pivot axis 72 to swing the arm 69 forwardly and release the pawl 67, so that the cables 50 may freely unwind from the drums 51 under the action of the springs 45 and 47 in pressing forwardly on the cylinders 44 and plungers 43 to automatically release the safety device and cause projection thereof in front of the machine in operative open position instantaneous with the application of the brakes to check the advance of the automobile. Since this operation is automatic with the application of the brakes, no independent operating device is necessary and since the natural instinct, in an emergency, to prevent striking a person, animal or object, is to apply the brakes, the possibility of injuring a person or animal by impact therewith is greatly lessened since the speed of the machine is reduced and the force of the impact lessened. In the operation, when it is desired to retract the safety device, the operator merely closes the switch 64 to operate the winding mechanism, which will be held by the pawl and ratchet means, or a crank 79 may be applied to the shaft 59 at its squared end in order to manually wind the cables 50 on the drums 51, to retract the safety device. When the safety device is projected in front of the machine and bumper, the flexible spring or resilient arms 34 and 35, will automatically spread apart to open position moving upwardly and downwardly so that a wide opening is provided at the front end of the open mouthed sheath, and should the latter strike a person, the flexible sheaths 32 and 33, will considerably lessen the likelihood of injury, by cushioning the impact. When the device is so extended or projected, the strips 32 and 33 will be unwound from the roller or cylinder 27, and will be automatically wound thereon upon the retraction of the arms 34 and 35 by the cables 50 as described. It should also be noted, that when the safety device is projected, the arms 34 and 35 will slide through the openings or notches 41 in the back of the housing in forwardly divergent relation above and below the roller 27 and automatically raise the cover 23 of the hood 20, which latter assisted by the action of its closing springs 25, will automatically move downwardly to a closed position to cover the forward ends of the safety device or arms thereof when in retracted position, thus protecting the same in inclement weather and also prevent any unsightly appearance, though the hood is relatively small and may be reduced to a size approximately 4 inches square. In this position, it is practically unnoticeable, and in addition to the bumper bar 26 provided thereon to prevent injury thereto will be located normally in rear of the front bumpers 16 so that the latter will take impact with the bumpers of other vehicles or automobiles. It is now believed that the operation of the device will be clear from the foregoing description.

While in the foregoing there has been shown and described the preferred embodiment of this invention it is to be understood that minor changes in the details of construction, combination, and arrangement of parts may be resorted to without departing from the spirit and scope of the invention as claimed.

What I claim:

1. A safety device of the class described, including an open mouthed sheath including arms adapted to be projected from the front of a vehicle when mounted thereon, means to project said arms, and means to retract said arms into closed position, flexible strips connected to the ends of said arms and extending within the same to be projected therewith, in forwardly divergent spaced relation with the arms and means for winding said strips when retracted with the arms.

2. In a safety device for vehicles, arms of resilient material extending longitudinally of a vehicle and adapted to be projected forwardly therefrom in upwardly curved and downwardly curved and divergent relation, means connecting the forward ends of the arms, flexible strips connected to said connecting means and extending downwardly and upwardly within the arms, to constitute impact cushioning means, a roller for normally winding said strips one over the other thereon, means connected to the rear divergent ends of the arms for projecting the same, means for retracting the arms and holding the same retracted, and means for releasing said latter means.

3. In a safety device for vehicles, arms of resilient material extending longitudinally of a machine and adapted to be projected forwardly therefrom in upwardly curved and downwardly curved and divergent relation, means connecting the forward ends of the arms, flexible strips connected to said connecting means and extending downwardly and upwardly within the arms, to constitute impact cushioning means, a roller for normally winding said strips one over the other thereon, means connected to the rear divergent ends of the arms for projecting the same, means for retracting the arms, plungers connected to the rear ends of the arms, cylinders in which said plungers operate, springs normally projecting the plungers, cables connected to the plungers and extending through the rear ends of the cylinders, winding means for the cables, braking means for the vehicle, and means actuated by the braking means to release the cables.

4. In a safety device for vehicles, arms of resilient material extending longitudinally of a machine and adapted to be projected forwardly therefrom in upwardly curved and downwardly curved and divergent relation, means connecting the forward ends of the arms, flexible strips connected to said connecting means and extending downwardly and upwardly within the arms, to constitute impact cushioning means, a roller for normally winding said strips one over the other thereon, means connected to the rear divergent ends of the arms for projecting the same, said vehicle having brake applying means operated by a foot pedal, power operated means for retracting the arms, means for holding said retracting means with the arms in retracted position, and release means for said retracting means including a pedal adjacent to the brake pedal and operated upon depression of the latter to release the same.

5. A safety device for automobiles including the combination with the braking means thereof having a brake pedal, a hood arranged across the automobile, a normally wound roller in said hood, a normally closed cover for said hood, spring arms extending through the hood above and below the roller in forwardly divergent relation, flexible strips connected to the forward ends of the arms and extending inwardly thereof and connected to the roller to be wound thereon one over the other, collapsible cylinders in rear of said arms, plungers connected to the cylinders and movable in said cylinders, means in the cylinders normally projecting the plungers and arms, winding means connected to the plungers for retracting the arms and moving the same within the cylinders to permit the cover of the hood to close, and means for releasing the winding means.

6. A safety device for automobiles including the combination with the braking means thereof having a brake pedal, a hood arranged across the automobile, a normally wound roller in said hood, a normally closed cover for said hood, spring arms extending through the hood above and below the roller in forwardly divergent relation, flexible strips connected to the forward ends of the arms and extending inwardly thereof and connected to the roller to be wound thereon one over the other, rollers at the forward ends of the lower arms, telescopic cylinders in rear of said arms, plungers connected to the cylinders and movable in said cylinders, springs in the cylinders normally projecting the plungers and arms, winding means connected to the plungers for retracting the arms and moving the same within the cylinders to permit the cover of the hood to close, and means for releasing the winding means, including a foot pedal adjacent to the brake pedal and a reducing gear associated with the winding mechanism having a normally engaged pawl and ratchet mechanism and a connection between the foot pedal and the pawl to release the pawl upon depression of the foot pedal with the brake pedal.

7. A safety device for automobiles including the combination with the braking means thereof having a brake pedal, a hood arranged across the automobile, a normally wound roller in said hood, a normally closed cover for said hood, spring arms extending through the hood above and below the roller in forwardly divergent relation, flexible strips connected to the forward ends of the arms and extending inwardly thereof and connected to the roller to be wound thereon one over the other, telescopic cylinders in rear of said arms, plungers connected to the cylinders and movable in said cylinders, springs in the cylinders normally projecting the plungers and arms, winding means connected to the plungers for retracting the arms and moving the same within the cylinders to permit the cover of the hood to close and the strips to wind on the roller when the arms and strips are retracted, said winding means including an electric motor for operating the winding means and a switch controlling the circuit to said motor, and release means for said winding means actuated upon depression of the brake pedal.

MANUEL ALVES DA SILVA.

REFERENCES CITED

The following references are of record in the file of this patent:

UNITED STATES PATENTS

| Number | Name | Date |
| --- | --- | --- |
| 1,386,308 | Bedaux | Aug. 2, 1921 |

FOREIGN PATENTS

| Number | Country | Date |
| --- | --- | --- |
| 4,168 | Great Britain | Feb. 18, 1913 |
| 322,304 | Great Britain | Dec. 5, 1929 |